United States Patent
Uchiyama et al.

(10) Patent No.: US 6,328,920 B1
(45) Date of Patent: Dec. 11, 2001

(54) MOLDING PROCESS FOR FORMING COMPLEX SHAPES

(75) Inventors: Yuichi Uchiyama, Dublin; Lam B. Sam, Columbus, both of OH (US)

(73) Assignee: Honda Engineering North America, Inc., Marysville, OH (US)

( * ) Notice: Subject to any disclaimer, the term of this patent is extended or adjusted under 35 U.S.C. 154(b) by 0 days.

(21) Appl. No.: 09/135,277

(22) Filed: Jul. 17, 1998

Related U.S. Application Data

(63) Continuation of application No. 08/757,277, filed on Nov. 27, 1996, now abandoned.

(51) Int. Cl.[7] .................................................. B29C 45/16
(52) U.S. Cl. ..................... 264/255; 264/266; 264/273; 264/275; 264/279; 264/319; 264/328.7; 264/328.8; 264/294; 425/130
(58) Field of Search ................................ 264/255, 328.7, 264/273, 266, 275, 279, 319, 328.8, 294; 425/130, 542

(56) References Cited

U.S. PATENT DOCUMENTS

| | | | |
|---|---|---|---|
| 4,235,833 | * 11/1980 | Arnason et al. | 264/255 |
| 4,389,358 | * 6/1983 | Hendry | 264/45.1 |
| 4,668,460 | * 5/1987 | Ongena | 264/255 |
| 5,034,076 | * 7/1991 | Masui et al. | 156/79 |
| 5,308,570 | * 5/1994 | Hara et al. | 264/255 |
| 5,676,901 | * 10/1997 | Higashi et al. | 264/255 |
| 5,902,534 | * 5/1999 | Fujishiro et al. | 264/255 |

FOREIGN PATENT DOCUMENTS

6092038 * 7/1981 (JP) .

* cited by examiner

*Primary Examiner*—Jan H. Silbaugh
*Assistant Examiner*—Suzanne E. McDowell
(74) *Attorney, Agent, or Firm*—Barbara Joan Haushalter; Alan T. McDonald

(57) ABSTRACT

A plastic part having a complex structure as a first layer and a simple structure as a second layer, is formed using a method for molding. Initially, a single mold is provided, the mold having an interior cavity and a runner reaching from an exterior of the mold to the cavity. The mold is kept closed while a quantity of a first plastic material is injected via the runner into the interior cavity to form a first layer of the plastic part. The mold is then partially opened, creating an increased interior cavity section, into which a quantity of a second plastic material is injected, via the runner, to form a second layer of the plastic part. The solidified plastic part can then be ejected from the mold.

20 Claims, 4 Drawing Sheets

MOLDING PROCESS FOR FORMING COMPLEX SHAPES

CROSS-REFERENCE TO RELATED APPLICATIONS

This application is a continuation of application Ser. No. 08/757,277, filed Nov. 27, 1996, now abandoned.

FIELD OF THE INVENTION

This invention relates generally to injection molding and injection compression molding, and particularly to a process for combining the advantages of injection molding and injection compression molding to form complex shapes.

BACKGROUND OF THE INVENTION

Injection molding is a major plastic part process. The mold is a two-section tool that has a hollow cavity in the center. The hollow form is filled with plastic to make the part. The injection molding process has as its general steps closing of the mold, application of clamping force, injection of plastic, curing of plastic, opening of the mold, and removal of the part. This process is then repeated. The mold halves close and a clamp force is applied to keep the two halves closed to resist the injection pressure inside the mold. The plastic flows in the hollow form to make the part.

Injection compression molding is similar to injection molding, with the major difference being that the plastic is injected without clamping pressure applied on the mold. The plastic is injected while the mold is not fully closed. During the final phase of the injection, the mold is closed and clamping force is applied to compress the plastic to make the shape. Thus, injection compression molding requires less clamping force because force is not needed to resist the pressure in the injection phase. The general steps of this process include injection of plastic in a slightly open mold, closing of the mold, curing of the plastic, opening of the mold, and ejection of the part.

Injection molding can be used to make complex parts, but its disadvantage is that the clamping force increases with the complexity and size of the part. Injection compression molding has the advantage of reduction in clamping force, a reduction of approximately 50–70%, but its disadvantage is that the part is smooth in shape.

It is seen then that there exists a need for a new process which combines certain advantages of both injection molding and injection compression molding, but eliminates certain disadvantages of each process.

SUMMARY OF THE INVENTION

This need is met by the injection-compression molding process, according to the present invention, wherein existing injection molding and injection compression molding are combined for manufacturing, using one mold for the two steps.

In accordance with one embodiment of the present invention, a method is provided for forming a part having a first layer which is a complex structure and a second layer which is a smooth structure. Initially, a single mold is provided, the mold having an interior cavity and a runner reaching from an exterior of the mold to the cavity. The mold is closed, and a quantity of a first plastic material is injected via the runner into the interior cavity to form a first layer of the plastic part. In this step, the appearance of the complex structure is non-critical and does not form the overall shape of the part. The mold is then partially opened, creating an increased interior cavity section, into which a quantity of a second plastic material is injected, via the runner, to form a second layer, as a smooth structure. The complex structure provides strength and function to the smooth structure. The solidified plastic part can then be ejected from the mold.

It is an advantage of the present invention that it can produce complex shapes with reduced clamping force. It is a feature of the present invention that the injection molding step and the injection compression molding step both use the same mold. That is, the process of the present invention combines both molding steps to make one part in one mold. The part requirement is a complex surface or side (containing structures for strength, stability and fastening functions) and a smooth surface or side for the sake of appearance. This is, of course, typical of many plastic parts and housings in the audio, video and automotive industries. Finally, it is an advantage of the present invention to make a relatively large part without using a large machine.

For a full understanding of the nature and objects of the present invention, reference may be had to the following detailed description taken in conjunction with the accompanying drawings and the appended claims.

DESCRIPTION OF THE PREFERRED EMBODIMENT

Figure 1A:
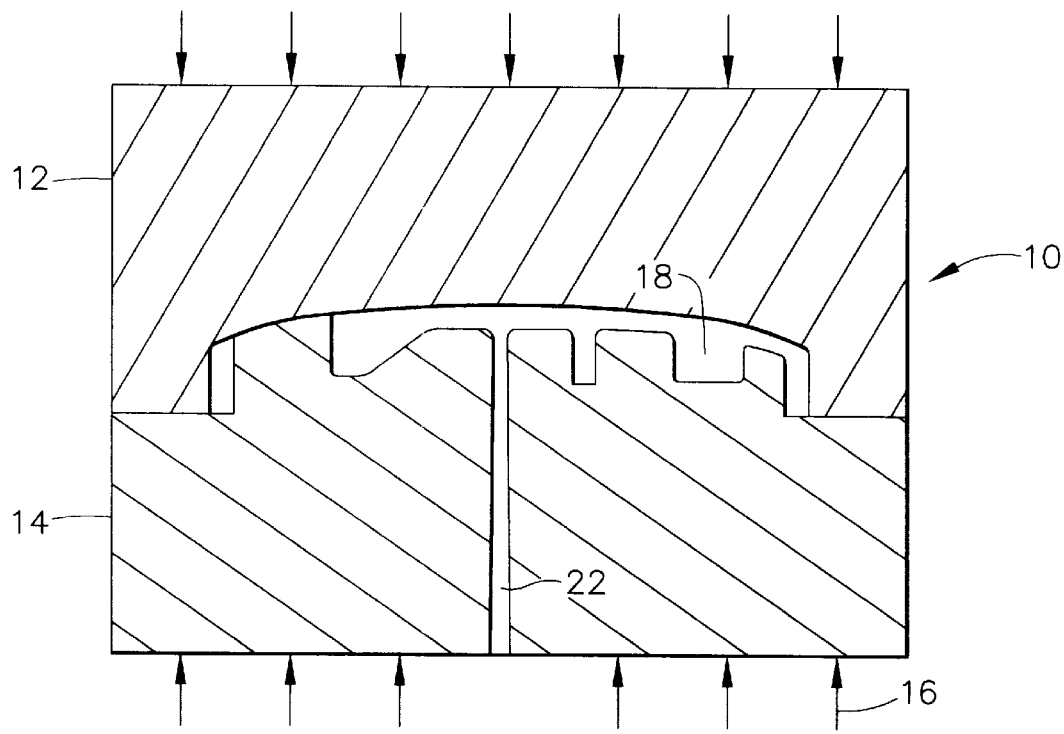
FIGS. 1A through 1D illustrate the steps of the molding process according to the present invention.

The present invention provides for a molding process capable of producing a relatively large part, having complex features, with a reduced clamping force required. Reduced clamping requirements are made in two ways. One, the part manufacturing is split into stages; and two, compression molding is used. Compression molding is used to make high surface quality parts like compact disks.

Referring now to the drawings, FIGS. 1A through 1D illustrate the steps of the molding process according to the present invention. In accordance with the present invention, a first injection forms the ribs, holes, shear edge, etc., surface for the compression molding step, i.e., the "complex" side or structure; and a second injection/compression forms an outer layer with a smooth surface, resulting in a part capable of having an equal thickness, smooth layer, but with varying complex layering patterns at different cross-sections.

A typical injection molding machine for the method of the present invention comprises an injection unit and a clamping unit, with an injection compression option. The injection unit melts the plastic material and injects the plastic into the mold, while the clamping unit applies a clamping force to hold the mold in place. The clamping force may be any suitable force, such as hydraulic or mechanical. The mold is typically a two-part solid steel block having a hollow form into which the molten plastic material is introduced to give the shape of the part. There is a runner system that connects the hollow form to the machine injection unit. The machine shoots or injects plastics material through the runner and fills up the hollow form. There is also a cooling system inside the mold to cure or solidify the plastic material.

In the drawings, a plastic part having a complex structure as a first layer and a simple structure as a second layer, is formed. A single mold 10 is provided, as shown in FIGS. 1A through 1D, comprising mold cavity 12 and mold core 14. The mold 10 is initially closed in the direction of arrows 16, as shown in FIG. 1A. The pattern or shape of the part to be made is already cut out in the mold, as the hollow form 18. Hence, there is a form 18 in the mold when the two parts 12 and 14 of the mold come together, or close.

Figure 1B:
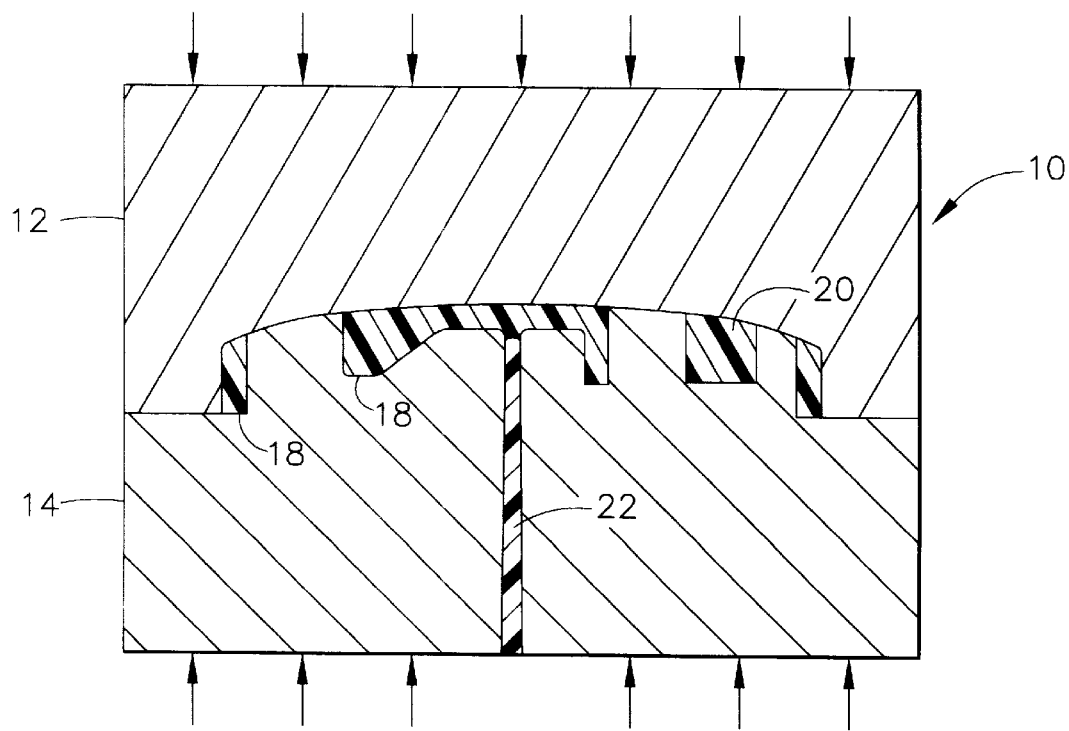
Figure 3:
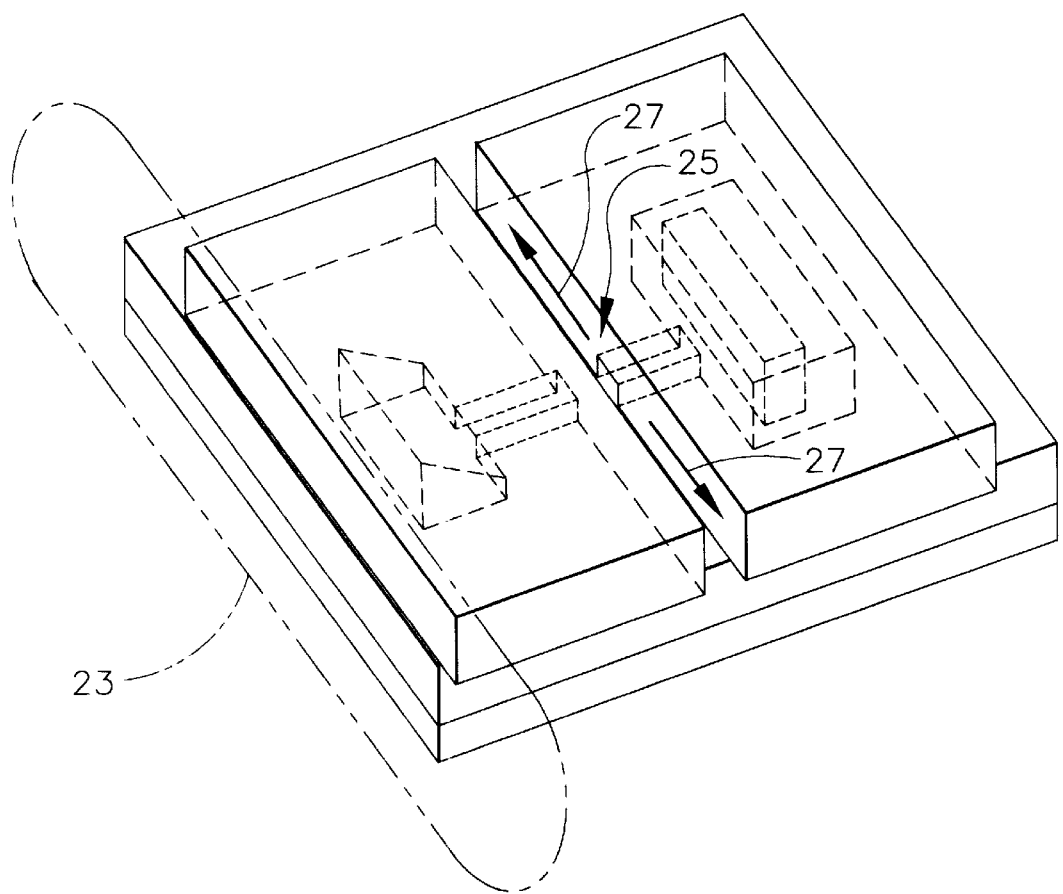
FIG. 3 is an isometric view of a part constructed in accordance with the present invention.

Continuing with FIGS. 1A–1D and referring also to FIG. 3, the plastic flows to the rib 23 via the outside rib. Plastic 20 is injected into hollow form 18, via a runner 22, to make the complex shape of the required part, as illustrated in FIG. 1B. As illustrated in FIG. 3, plastic enters the mold at location 25, and travels to rib 23 in the direction of arrows 27.

Figure 1C:
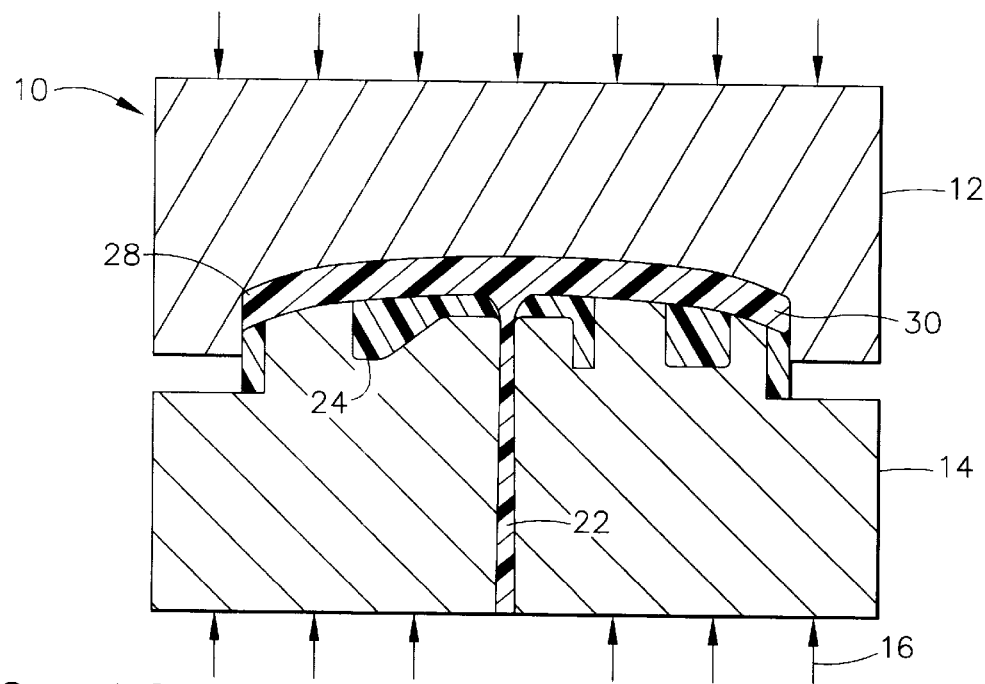
Figure 1D:
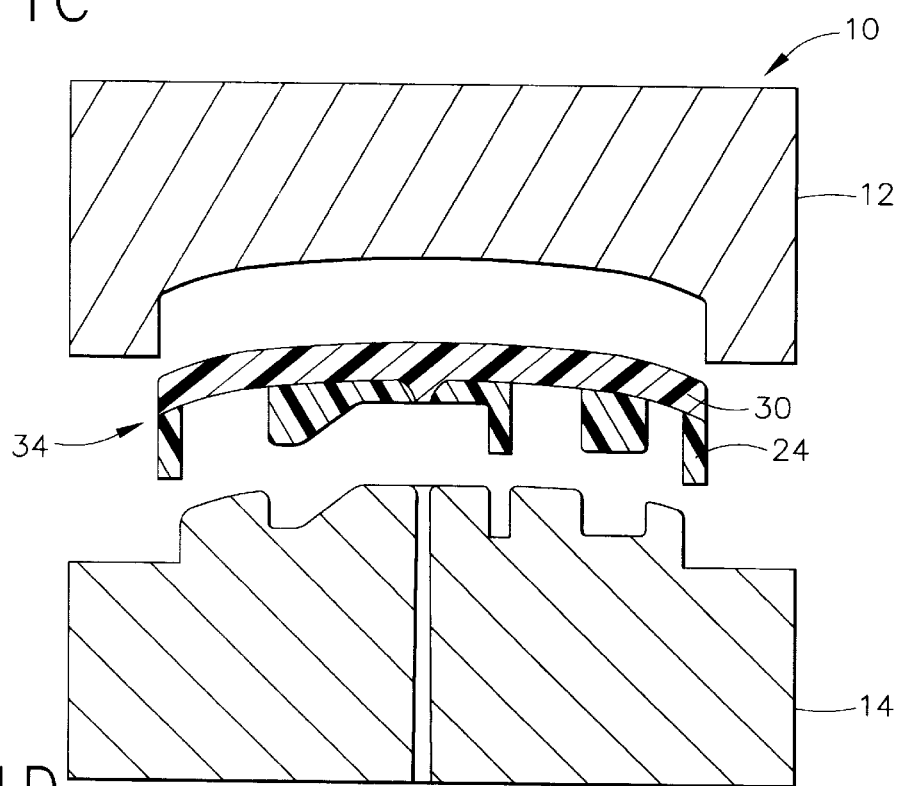

Reference number 24 in FIGS. 1C and 1D refers to first plastic layer 24, which is typically the complex structure. The complex structure does not form the overall shape of the part, and therefore does not have the shape of the final part. The complex layer 24 provides strength and function to a second layer 30, typically a smooth layer for purposes of appearance, or aesthetic value. The molding process during the complex layer molding portion of the inventive method is injection molding.

Referring now to FIG. 1C, after injection of the first quantity of plastic 20, the mold 10 opens slightly, creating an increased interior form. In section views, the complex layer 24 can have a different pattern in each section, rather than the same layering pattern through every section as is the case with the prior art.

Continuing with the invention, a mechanical system, as is known in the art, can be used to operate the opening and closing of the mold. The mold can be opened using a hydraulic unit, or by reducing the clamping force. A quantity of a second plastic material 28 is then injected into the increased interior form to form the second layer 30 of the plastic part, and the mold is held closed, as shown by arrows 16. The complex layer 24 formed in the first injection provides strength and function to the plastic part, which is given an aesthetic appearance by virtue of the smooth layer 30 formed in the second injection/compression. Since the second layer 30 is a smooth surface layer, the molding process during this portion of the method is an injection-compression molding to make the simpler (smoother) body layer.

Figure 2A:
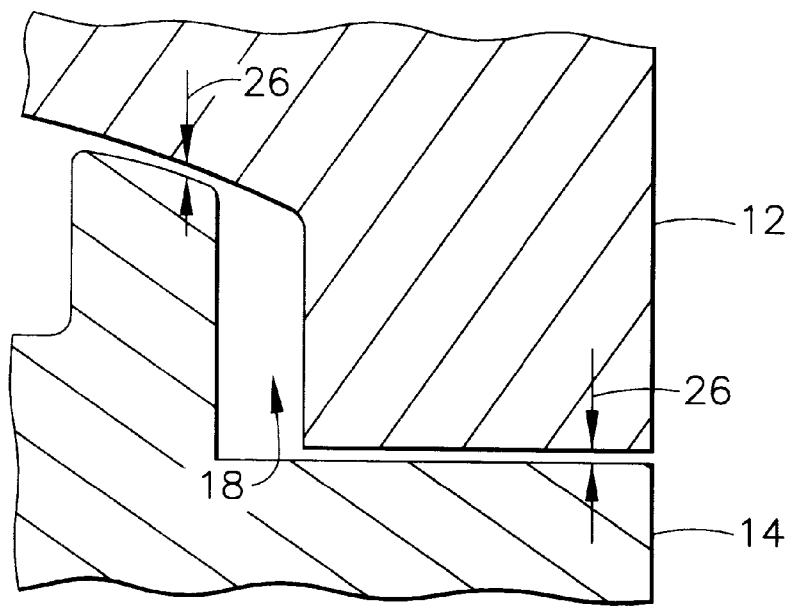
FIGS. 2A and 2B illustrate the shear edge feature of the present invention.
Figure 2B:
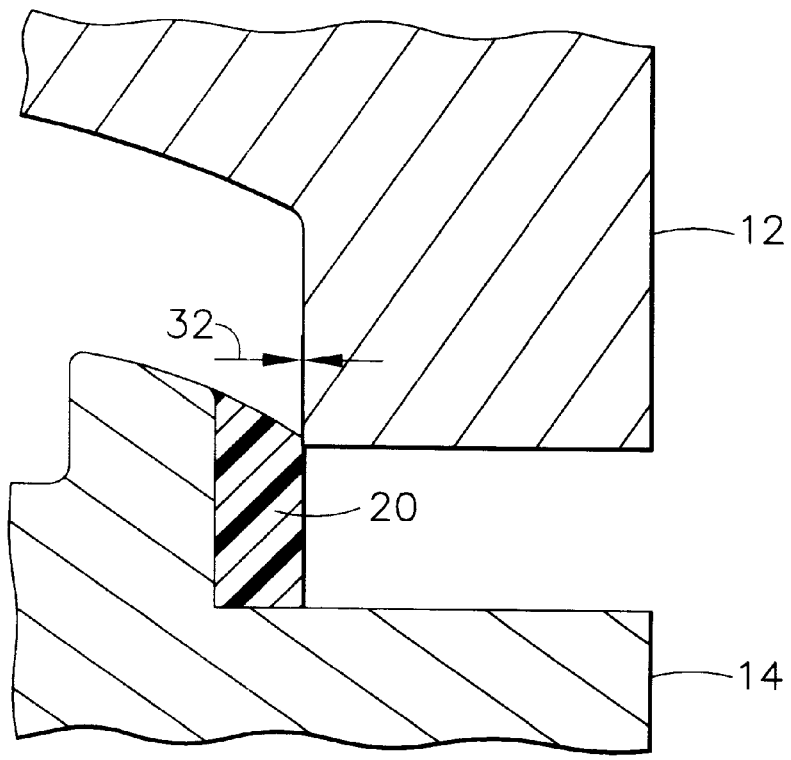

Referring now to FIGS. 2A and 2B, the concept of shear edge in a two part mold is critical to the process of the present invention, especially in the second injection. The shear edge 26, where the two parts of the mold (mold cavity 12 and mold core 14) meet very tightly, requires a given tolerance to prevent the plastic from flowing to the outside of the part form 18. As a liquid plastic enters the hollow form 18 of the mold 10 via the runner system 22, the shear edge 26 would prevent the plastic from flowing out of the hollow form 18. The shear edge 26 typically is metal-to-metal and is formed by the closing of mold cavity 12 and mold core 14 of the mold 10.

In accordance with the present invention, the plastic material of the first injection of the injection molding process actually establishes the surface for a shear edge 32 used for the second injection, in the direction of movement of the mold, as illustrated in FIG. 2B. The new shear edge 32 for the second injection uses different surfaces than the previous shear edge. This is unique to the present invention because the shear edge 32 is plastic-to-metal and is made from the partial part 20 surface, shown in FIG. 1B, and another mold cavity 12 surface. The second shear edge is in the direction of the movement of the mold, which is different from the direction of the first shear edge.

Continuing with FIG. 1C, the part, comprising the two plastic layers 24 and 30, is then solidified in the mold 10. The mold is held closed after each injection to cure the part for ejection. In FIG. 1D, the part 34, comprised of a complex shape as a first layer 24 and a smooth surface shape as a second layer 30, is ejected from the mold.

The present invention uses a single mold 10 for a two-step process to make a single part. This provides the advantage of reducing the clamping force. The two structures of the part may be the same plastic material, or different plastic materials. Furthermore, the creation of the second shear edge, as a plastic-to-metal shear edge, provides a shear edge in the direction of mold movement.

The present invention combines injection molding and injection compression molding to make a single part, having a complex shape with a smooth exterior surface, using a single mold. One injection is made to form the complex shape, and a second injection is made into the same mold such that the mold contains the product of both injections at one time, to make the smooth surface face on the complex shape. The process is versatile in that two different plastics may be used, one for each injection.

Having described the invention in detail and by reference to the preferred embodiment thereof, it will be apparent that other modifications and variations are possible without departing from the scope of the invention defined in the appended claims.

What is claimed is:

1. For forming a plastic part having a complex structure as a first layer and a smooth structure as a second layer, a method for molding comprising the steps of:

providing a single mold, the mold having an interior cavity and a runner reaching from an exterior of the mold to the cavity;

closing the mold;

injecting a quantity of a first plastic material via the runner into the interior cavity while maintaining pressure on the mold to maintain the mold in its closed state to form a complex structure as a first layer of the plastic part, wherein the appearance of the complex structure is non-critical;

partially opening the mold to create an increased interior cavity section;

injecting a quantity of a second plastic material via the runner and into the increased interior cavity section while maintaining the mold in its partially open state;

closing the mold and applying clamping force to the mold to compress the second plastic material and thereby form a smooth structure as a second layer of the plastic part, wherein the complex structure provides strength to the smooth structure; and ejecting the plastic part.

2. A method for molding as claimed in claim 1 wherein the first plastic material is chemically compatible with the second plastic material.

3. A method for molding as claimed in claim 1 wherein the first plastic material is a different plastic material than the second plastic material.

4. A method for molding as claimed in claim 1 wherein the complex structure has varying layering patterns at any cross-section.

5. A method for molding as claimed in claim 1 wherein the single mold comprises a mold cavity and a mold core.

6. A method for molding as claimed in claim 5 wherein the mold cavity and the mold core meet tightly to form a first shear edge for a first injection.

7. A method as claimed in claim 6 wherein the first plastic material establishes a surface for a second shear edge for the second injection.

8. A method as claimed in claim 7 wherein the second shear edge uses different surfaces than the first shear edge.

9. A method as claimed in claim 7 wherein the second shear edge has a direction of movement which is the same as a direction of movement of the mold and different from a direction of movement of the first shear edge.

10. For forming a plastic part, a method for molding comprising the steps of:

provdiing a single mold, the mold having an interior cavity and a runner reaching from an exterior of the mold to the cavity;

closing the mold;

injecting a quantity of a first plastic material via the runner into the interior cavity while maintaining pressure on the mold to maintain the mold in its closed state to form a complex layer of the plastic part, the complex layer having a non-critical appearance and capable of providing strength to the plastic part, and whereby a metal-to-plastic shear edge is established during injection of the first plastic part;

partially opening the mold to create an increased interior cavity section;

injecting a quantity of a second plastic material via the runner and into the increased interior cavity section while maintaining pressure on the mold to maintain the mold in its partially open state;

closing the mold and applying clamping force to the mold to compress the second plastic material and thereby form a smooth layer of the plastic part; and ejecting the plastic part.

11. A method for molding as claimed in claim 10 wherein the single mold comprises a mold cavity and a mold core.

12. A method for molding as claimed in claim 11 wherein the mold cavity and the mold core meet tightly to form a first shear edge.

13. A method as claimed in claim 12 wherein a second shear edge is established during injection of the first plastic material.

14. A method as claimed in claim 13 wherein the second shear edge comprises a metal-to-plastic shear edge.

15. A method as claimed in claim 14 wherein the second shear edge is in a different direction than the first shear edge.

16. A method as claimed in claim 14 wherein the metal-to-plastic shear edge is used during injection of the second plastic material.

17. For forming a plastic part having a complex structure as a first layer and a smooth structure as a second layer, a method for molding comprising the steps of:

providing a single mold, the mold having an interior mold cavity and a mold core reaching from an exterior of the mold to the cavity;

closing the mold;

forming a first shear edge for a first injection by securely abutting the mold cavity against the mold core;

injecting a quantity of a first plastic material via the mold core into the mold cavity while maintaining pressure on the mold in its closed state to form a complex structure as a first layer of the plastic part, wherein the appearance of the complex structure is non-critical;

partially opening the mold to create an increased interior mold cavity section;

injecting a quantity of a second plastic material via the mold core and into the increased interior mold cavity section while maintaining pressure on the mold to maintain the mold in its partially open state;

closing the mold and applying clamping force to the mold to compress the second plastic material and thereby form a smooth structure as a second layer of the plastic part, wherein the complex structure provides strength to the smooth structure; and ejecting the plastic part.

18. A method as claimed in claim 17 wherein the first plastic material establishes a surface for a second shear edge for the second injection.

19. A method as claimed in claim 18 wherein the second shear edge uses different surfaces than the first shear edge.

20. A method as claimed in claim 18 wherein the second shear edge has a direction of movement which is the same as a direction of movement of the mold and different from a direction of movement of the first shear edge.

* * * * *